United States Patent
Zhu et al.

(10) Patent No.: US 12,464,374 B2
(45) Date of Patent: Nov. 4, 2025

(54) SMART WINDOW DETERMINATION FOR BEAM SWEEP ON PHYSICAL DOWNLINK SHARED CHANNEL DEMODULATION REFERENCE SIGNAL

(71) Applicant: QUALCOMM Incorporated, San Diego, CA (US)

(72) Inventors: Jun Zhu, San Diego, CA (US); Mihir Vijay Laghate, San Diego, CA (US); Raghu Narayan Challa, San Diego, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 811 days.

(21) Appl. No.: 17/657,574

(22) Filed: Mar. 31, 2022

(65) Prior Publication Data
US 2023/0319588 A1    Oct. 5, 2023

(51) Int. Cl.
*H04W 16/28* (2009.01)
*H04B 7/06* (2006.01)
(Continued)

(52) U.S. Cl.
CPC ............ *H04W 16/28* (2013.01); *H04B 7/063* (2013.01); *H04B 7/0695* (2013.01); *H04B 7/088* (2013.01); *H04L 5/0051* (2013.01)

(58) Field of Classification Search
CPC ..... H04W 16/28; H04B 7/063; H04B 7/0695; H04B 7/088; H04L 5/0051
See application file for complete search history.

(56) References Cited

U.S. PATENT DOCUMENTS

2018/0367205 A1* 12/2018 Liu ...................... H04B 7/0486
2018/0368142 A1* 12/2018 Liou ................. H04W 74/0808
(Continued)

OTHER PUBLICATIONS

Nokia et al., "Determination of PF and PO in NR", 3GPP TSG-RAN WG2 Meeting #102, R2-1806931 Determination of PF and PO in NR, 3rd Generation Partnership Project (3GPP), Mobile Competence Centre, 650, Route Des Lucioles, F-06921 Sophia-Antipolis Cedex, France, vol. RAN WG2, No. Busan, May 21, 2018-Apr. 25, 2018, 4 pages, May 11, 2018, XP051464469, p. 4.
(Continued)

*Primary Examiner* — Ricky Q Ngo
*Assistant Examiner* — David M Kayal
(74) *Attorney, Agent, or Firm* — Harrity & Harrity, LLP

(57) ABSTRACT

Various aspects of the present disclosure generally relate to wireless communication. In some aspects, a user equipment (UE) may identify a beam management window based at least in part on one or more downlink traffic parameters satisfying a window opening condition. The UE may perform a beam sweep on a set of beams associated with one or more physical downlink shared channel (PDSCH) demodulation reference signal (DMRS) transmissions that are received during the beam management window. The UE may select, among the set of beams associated with the one or more PDSCH DMRS transmissions received during the beam management window, a beam to use to communicate with a network node based at least in part on one or more metrics associated with each respective beam included in the set of beams. Numerous other aspects are described.

30 Claims, 7 Drawing Sheets

(51) Int. Cl.
*H04B 7/08* (2006.01)
*H04L 5/00* (2006.01)

(56) References Cited

U.S. PATENT DOCUMENTS

| | | | |
|---|---|---|---|
| 2019/0159188 A1* | 5/2019 | Sadiq | H04W 72/046 |
| 2019/0394749 A1 | 12/2019 | Islam et al. | |
| 2020/0313747 A1* | 10/2020 | Xu | H04B 7/0617 |
| 2020/0374960 A1* | 11/2020 | Deenoo | H04W 76/19 |
| 2021/0266058 A1* | 8/2021 | Yu | H04B 7/08 |
| 2022/0085935 A1* | 3/2022 | Pezeshki | H04W 72/21 |
| 2022/0361006 A1* | 11/2022 | Xu | H04L 5/0023 |
| 2023/0362942 A1* | 11/2023 | Zhou | H04L 5/0053 |
| 2024/0007242 A1* | 1/2024 | Xiong | H04L 5/0048 |

OTHER PUBLICATIONS

Partial International Search Report—PCT/US2023/063781—ISA/EPO—Jun. 9, 2023.
International Search Report and Written Opinion—PCT/US2023/063781—ISA/EPO—Jul. 31, 2023.

* cited by examiner

SMART WINDOW DETERMINATION FOR BEAM SWEEP ON PHYSICAL DOWNLINK SHARED CHANNEL DEMODULATION REFERENCE SIGNAL

FIELD OF THE DISCLOSURE

Aspects of the present disclosure generally relate to wireless communication and to techniques and apparatuses for a smart window determination for a beam sweep on a physical downlink shared channel (PDSCH) demodulation reference signal (DMRS).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include identifying a beam management window based at least in part on one or more downlink traffic parameters satisfying a window opening condition. The method may include performing a beam sweep on a set of beams associated with one or more physical downlink shared channel (PDSCH) demodulation reference signal (DMRS) transmissions that are received during the beam management window. The method may include selecting, among the set of beams associated with the one or more PDSCH DMRS transmissions received during the beam management window, a beam to use to communicate with a network node based at least in part on one or more metrics associated with each respective beam included in the set of beams.

Some aspects described herein relate to a UE for wireless communication. The UE may include a memory and one or more processors coupled to the memory. The one or more processors may be configured to identify a beam management window based at least in part on one or more downlink traffic parameters satisfying a window opening condition. The one or more processors may be configured to perform a beam sweep on a set of beams associated with one or more PDSCH DMRS transmissions that are received during the beam management window. The one or more processors may be configured to select, among the set of beams associated with the one or more PDSCH DMRS transmissions received during the beam management window, a beam to use to communicate with a network node based at least in part on one or more metrics associated with each respective beam included in the set of beams.

Some aspects described herein relate to a non-transitory computer-readable medium that stores a set of instructions for wireless communication by a UE. The set of instructions, when executed by one or more processors of the UE, may cause the UE to identify a beam management window based at least in part on one or more downlink traffic parameters satisfying a window opening condition. The set of instructions, when executed by one or more processors of the UE, may cause the UE to perform a beam sweep on a set of beams associated with one or more PDSCH DMRS transmissions that are received during the beam management window. The set of instructions, when executed by one or more processors of the UE, may cause the UE to select, among the set of beams associated with the one or more PDSCH DMRS transmissions received during the beam management window, a beam to use to communicate with a network node based at least in part on one or more metrics associated with each respective beam included in the set of beams.

Some aspects described herein relate to an apparatus for wireless communication. The apparatus may include means for identifying a beam management window based at least in part on one or more downlink traffic parameters satisfying a window opening condition. The apparatus may include means for performing a beam sweep on a set of beams associated with one or more PDSCH DMRS transmissions that are received during the beam management window. The apparatus may include means for selecting, among the set of beams associated with the one or more PDSCH DMRS transmissions received during the beam management window, a beam to use to communicate with a network node based at least in part on one or more metrics associated with each respective beam included in the set of beams.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
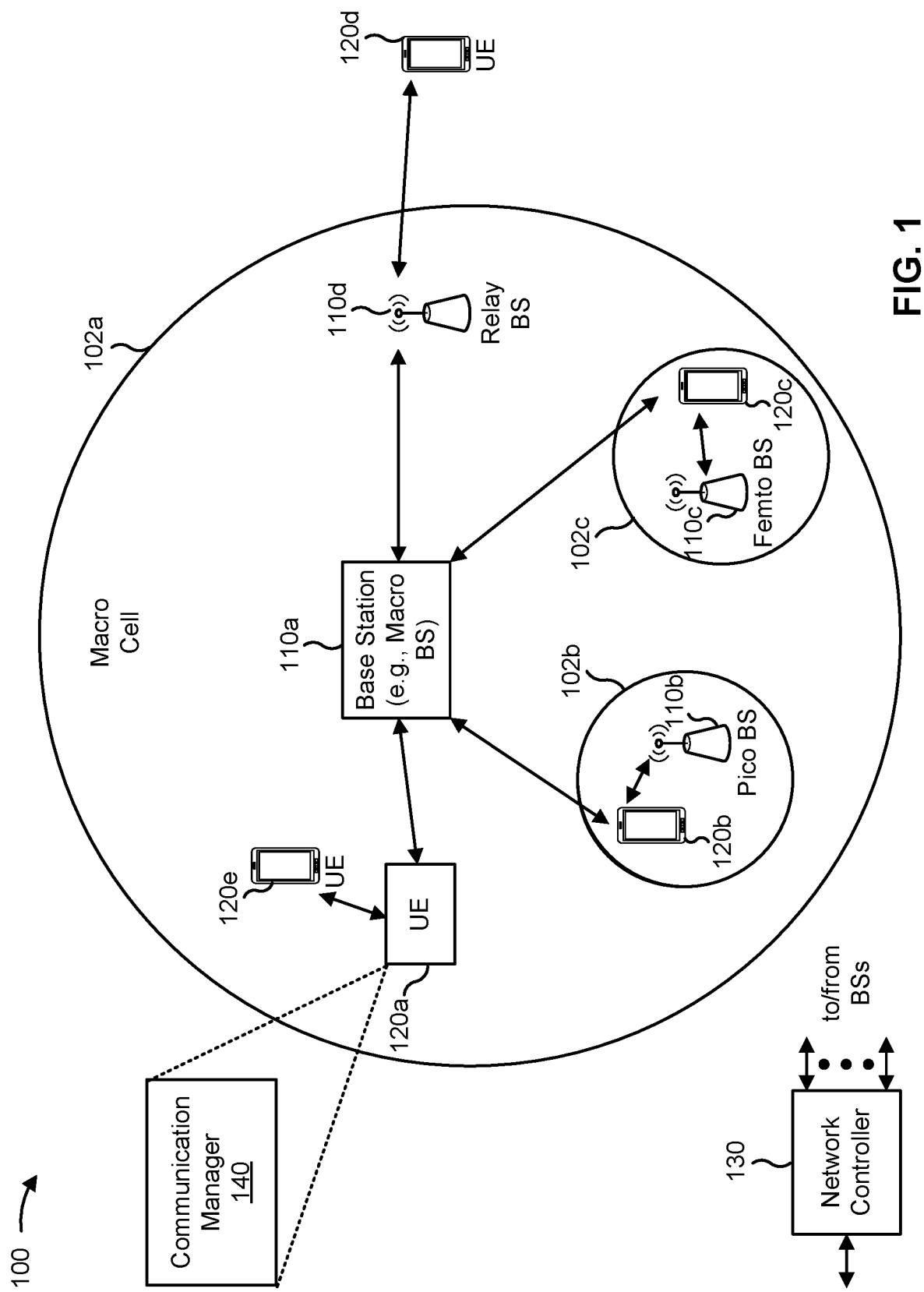
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may identify a beam management window based at least in part on one or more downlink traffic parameters satisfying a window opening condition; perform a beam sweep on a set of beams associated with one or more physical downlink shared channel (PDSCH) demodulation reference signal (DMRS) transmissions that are received during the beam management window; and select, among the set of beams associated with the one or more PDSCH DMRS transmissions received during the beam management window, a beam to use to communicate with a network node based at least in part on one or more metrics associated with each respective beam included in the set of beams. Additionally, or alternatively, the communication manager 140 may perform one or more other operations described herein.

In some aspects, the term "base station" (e.g., the base station 110) or "network node" or "network entity" may refer to an aggregated base station, a disaggregated base station, an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (MC), or a Non-Real Time (Non-RT) MC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), TRP, or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (e.g., within a single device or unit). A disaggregated base station may be configured to utilize a protocol stack that is physically or logically distributed among two or more units (e.g., one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN) such as the network configuration sponsored by the O-RAN Alliance, or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

As indicated above, FIG. 1 is provided as an example. Other examples may differ from what is described with regard to FIG. 1.

Figure 2:
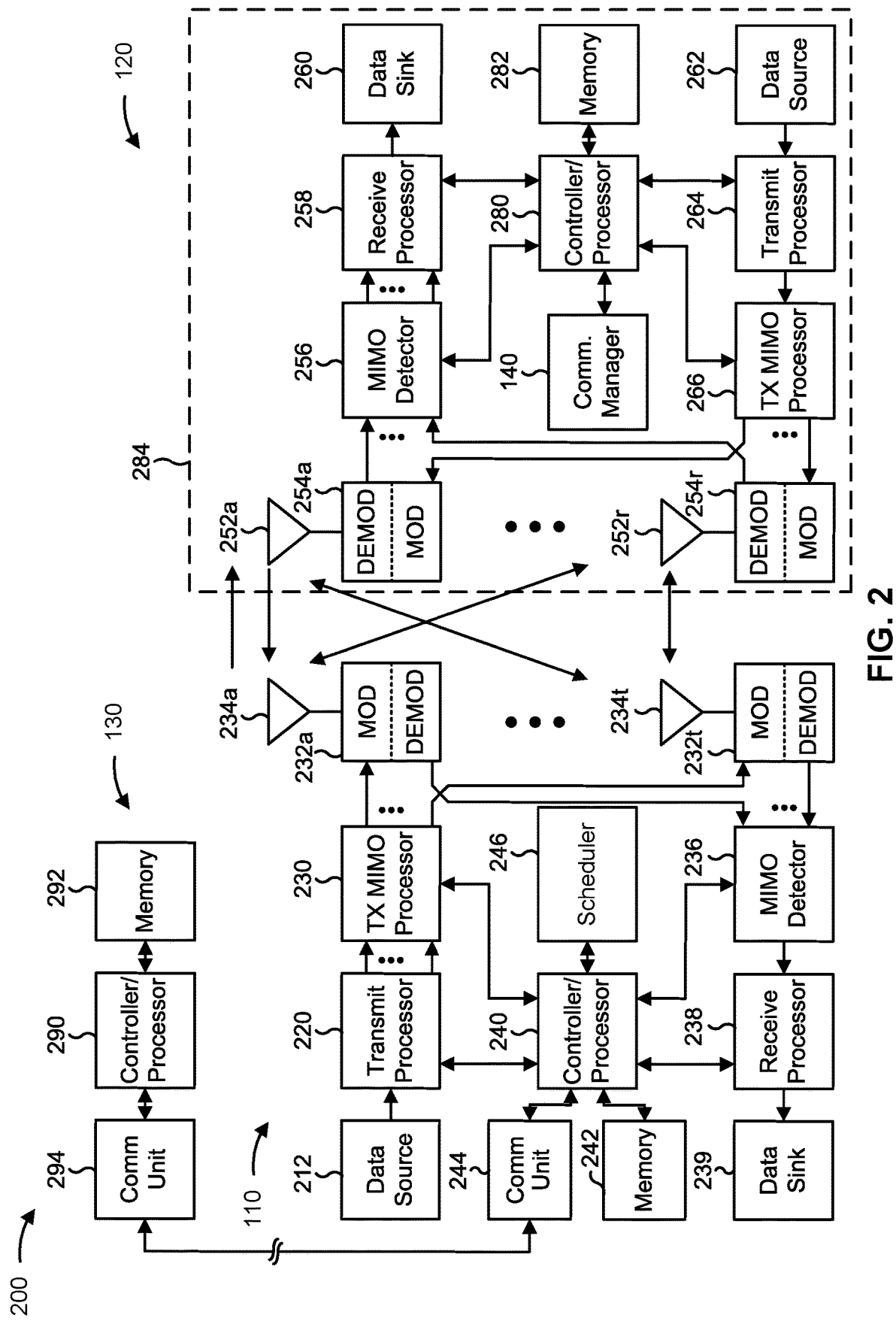
FIG. 2 is a diagram illustrating an example of a base station in communication with a user equipment in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-7).

The controller/processor 240 of the base station 110, the controller/processor 280 of the UE 120, and/or any other component(s) of FIG. 2 may perform one or more techniques associated with a smart window determination for a beam sweep on a PDSCH DMRS, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some examples, executing instructions may include running the instructions, converting the instructions, compiling the instructions, and/or interpreting the instructions, among other examples.

In some aspects, the UE 120 includes means for identifying a beam management window based at least in part on one or more downlink traffic parameters satisfying a window opening condition; means for performing a beam sweep on a set of beams associated with one or more PDSCH DMRS transmissions that are received during the beam management window; and/or means for selecting, among the set of beams associated with the one or more PDSCH DMRS transmissions received during the beam management window, a beam to use to communicate with a network node based at least in part on one or more metrics associated with each respective beam included in the set of beams. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
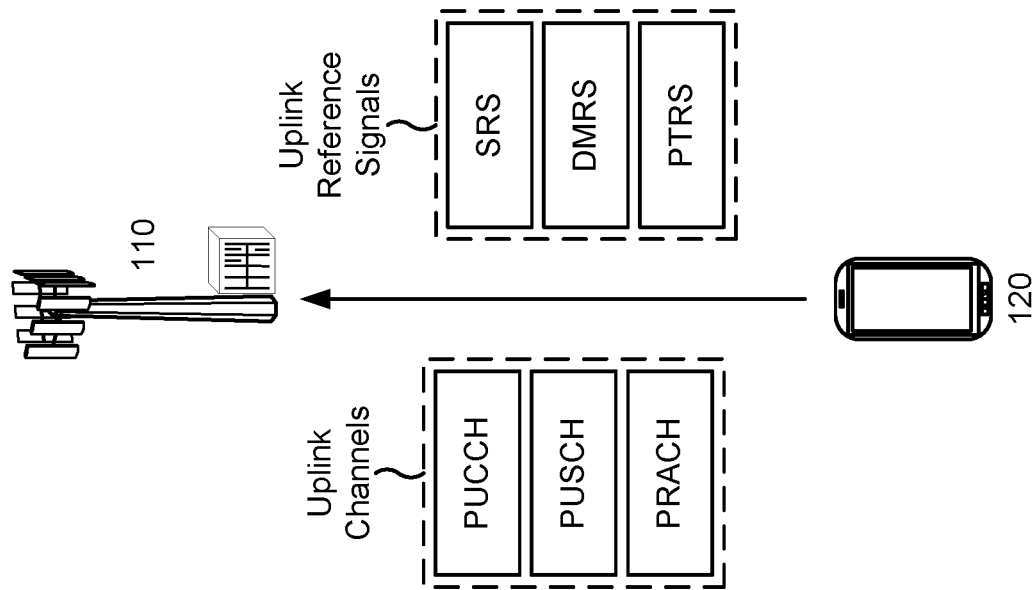
FIG. 3 is a diagram illustrating an example of physical channels and reference signals in a wireless network, in accordance with the present disclosure.
Figure 3:
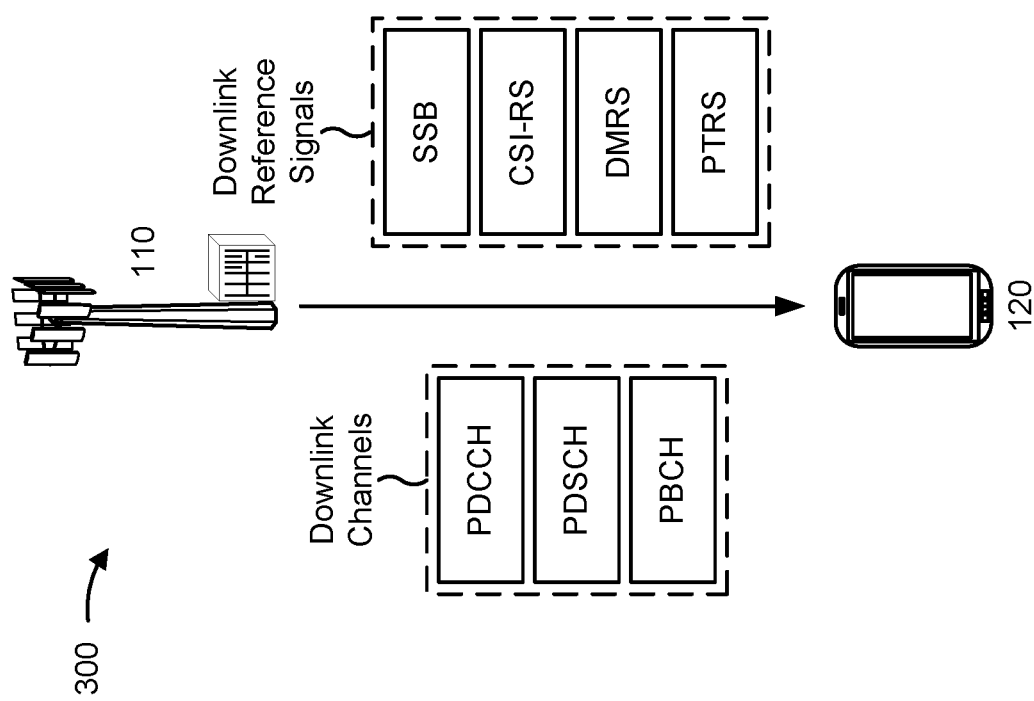

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a PDSCH that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, and/or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection or beam management.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., a PDCCH, PDSCH, PBCH, PUCCH, or PUSCH). The design and mapping of a DMRS may be specific to the physical channel for which the DMRS is used for channel estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
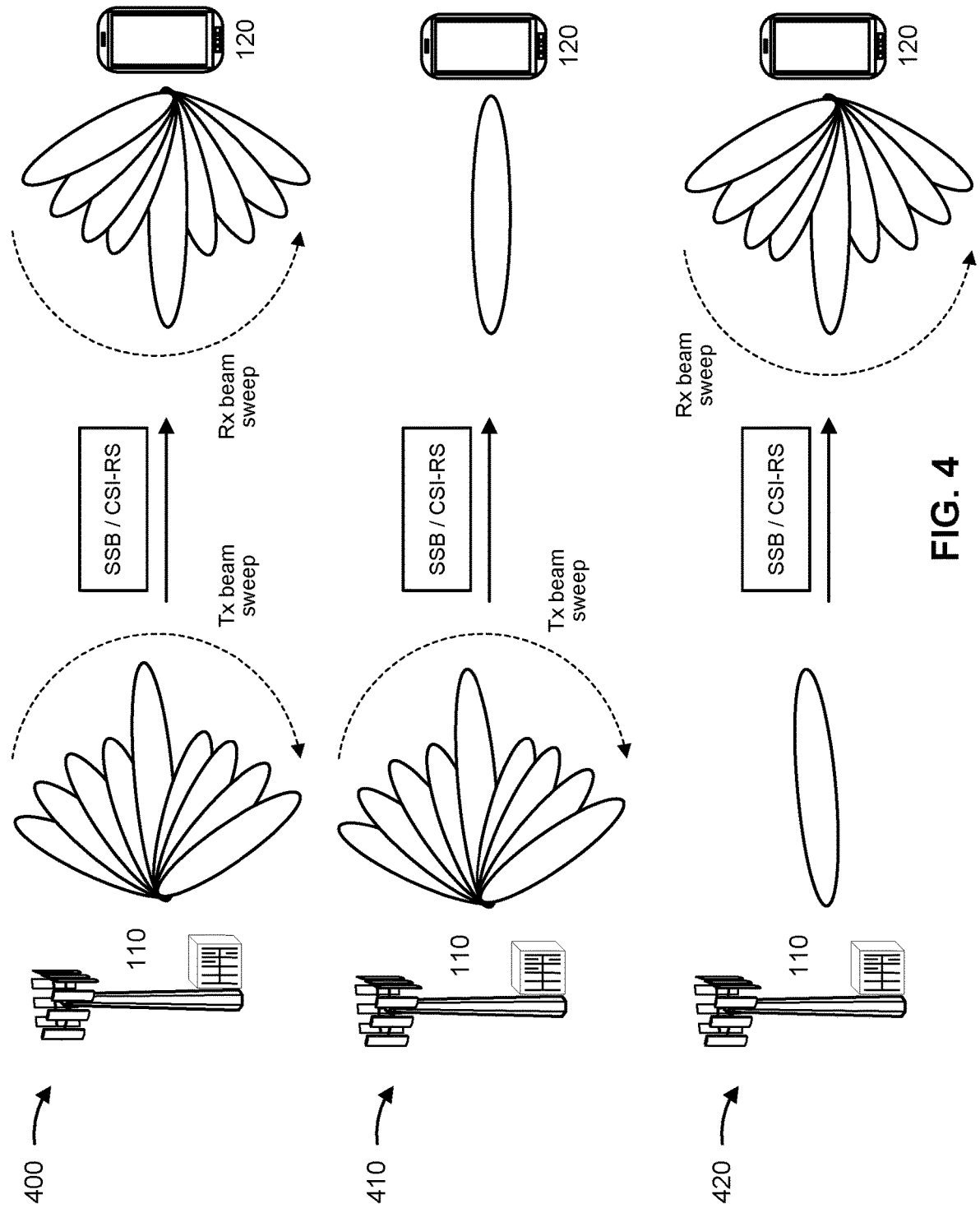
FIG. 4 is a diagram illustrating examples of beam management procedures, in accordance with the present disclosure.

FIG. 4 is a diagram illustrating examples 400, 410, and 420 of beam management procedures based on downlink reference signal transmissions, in accordance with the present disclosure. As shown in FIG. 4, examples 400, 410, and 420 include a UE 120 in communication with a base station 110 in a wireless network (e.g., wireless network 100). However, the devices shown in FIG. 4 are provided as examples, and the wireless network may support communication and beam management between other devices (e.g., between a UE 120 and a TRP, DU, or RU, between a mobile termination node and a control node, between an IAB child node and an IAB parent node, and/or between a scheduled node and a scheduling node). In some aspects, the UE 120 and the base station 110 may be in a connected state (e.g., a radio resource control (RRC) connected state) when performing the beam management procedure(s).

As shown in FIG. 4, example 400 may include a base station 110 and a UE 120 communicating to perform beam management using SSB or CSI-RS transmissions. Example 400 depicts a first beam management procedure (e.g., P1 beam management). The first beam management procedure may be referred to as a beam selection procedure, an initial beam acquisition procedure, a beam sweeping procedure, a cell search procedure, and/or a beam search procedure. As shown in FIG. 4 and example 400, SSBs and/or CSI-RSs may be configured to be transmitted from the base station 110 to the UE 120 during the first beam management procedure. For example, an SSB transmitted by the base station 110 is a rank-1 periodic reference signal that is always transmitted by the base station 110 to enable initial network acquisition and synchronization in addition to beam selection and beam management. For example, an identifier associated with an SSB may have a one-to-one mapping to a transmit beam used by the base station 110, and the one-to-one mapping may be invariant (e.g., static) over time. The CSI-RSs used for beam selection or beam management may be configured to be periodic (e.g., using RRC signaling), semi-persistent (e.g., using media access control (MAC) control element (MAC-CE) signaling), and/or aperiodic (e.g., using DCI).

The first beam management procedure may include the base station 110 performing a beam sweep over multiple transmit (Tx) beams. The base station 110 may transmit an SSB or a CSI-RS using each transmit beam for beam management. To enable the UE 120 to perform receive (Rx) beam sweeping, the base station 110 may use a transmit beam to transmit (e.g., with repetitions) each SSB or CSI-RS at multiple times within the same reference signal resource set so that the UE 120 can perform a beam sweep over multiple receive beams in multiple transmission instances. For example, if the base station 110 has a set of N transmit beams and the UE 120 has a set of M receive beams, the SSB or CSI-RS may be transmitted on each of the N transmit beams M times such that the UE 120 may receive M instances of the SSB or CSI-RS per transmit beam. In other words, for each transmit beam of the base station 110, the UE 120 may perform a beam sweep through the receive beams of the UE 120. As a result, the first beam management procedure may enable the UE 120 to measure an SSB or CSI-RS on different transmit beams using different receive beams to support selection of one or more transmit/receive beam pair(s) (e.g., a pairing between a transmit beam of the base station 110 and a receive beam of the UE 120). The UE 120 may report the measurements to the base station 110 to enable the base station 110 to select one or more beam pairs for communication between the base station 110 and the UE 120.

As shown in FIG. 4, example 410 may include a base station 110 and a UE 120 communicating to perform beam management using SSBs or CSI-RSs. Example 410 depicts a second beam management procedure (e.g., P2 beam management). The second beam management procedure may be referred to as a beam refinement procedure, a base station beam refinement procedure, a network node beam refinement procedure, and/or a transmit beam refinement procedure, among other examples. As shown in FIG. 4 and example 410, SSBs and/or CSI-RSs may be configured to be transmitted from the base station 110 to the UE 120. The SSBs may be periodic, and the CSI-RSs may be configured to be aperiodic (e.g., using DCI). The second beam management procedure may include the base station 110 performing a beam sweep over one or more transmit beams. The one or more transmit beams may be a subset of all transmit beams associated with the base station 110 (e.g., determined based at least in part on measurements reported by the UE 120 in connection with the first beam management procedure). The base station 110 may transmit an SSB or a CSI-RS using each transmit beam of the one or more transmit beams for beam management. The UE 120 may measure each SSB or CSI-RS using a single (e.g., a same) receive beam (e.g., determined based at least in part on measurements performed in connection with the first beam management procedure). The second beam management procedure may enable the base station 110 to select a best transmit beam based at least in part on measurements of the SSBs and/or CSI-RSs (e.g., measured by the UE 120 using the single receive beam) reported by the UE 120.

As shown in FIG. 4, example 420 depicts a third beam management procedure (e.g., P3 beam management). The third beam management procedure may be referred to as a beam refinement procedure, a UE beam refinement procedure, a receive beam refinement procedure, and/or a UE beam management procedure, among other examples. As shown in FIG. 4 and example 420, one or more SSBS or CSI-RSs may be configured to be transmitted from the base station 110 to the UE 120. The SSBs may be configured to be periodic, and the CSI-RSs may be configured to be aperiodic (e.g., using DCI). The third beam management process may include the base station 110 transmitting the one or more SSBs or CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) an SSB or CSI-RS at multiple times within the same reference signal resource set such that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the UE 120 to select a best receive beam based at least in part on measurements of the SSBs or CSI-RSs and/or may enable the base station 110 to select a best receive beam for the UE 120 based at least in part on reported measurements received from the UE 120 (e.g., measurements of the SSB and/or CSI-RS using the one or more receive beams).

In general, wireless communication standards currently specify that UE beam management (e.g., in FR2 or millimeter wave bands) is performed based on either SSB transmissions or CSI-RS P3 transmissions. However, constraining UE beam management to SSB or CSI-RS P3 transmissions may result in an inability to optimize rank-2 performance, where a rank value generally refers to a number of transmission streams that are observed at a receiver (e.g., a UE 120). For example, in some cases, a transmit antenna and/or a receive antenna may have two ports, which may include a horizontally polarized (H) port and a vertically polarized (V) port. Accordingly, in cases where a transmitter (e.g., the base station 110) transmits a signal using both the H port and the V port independently and/or transmits a signal using a suitable precoder (e.g., a non-linear precoder), a receiver (e.g., the UE 120) may simultaneously observe two streams of the transmitted signal, which may be referred to as rank-2 communication. Alternatively, in cases where the transmitter uses a linear precoder (e.g., an H+V precoder or an H−V precoder), or transmits a signal using only one port (e.g., only the H port or only the V port), the receiver may observe only one stream of the transmitted signal, which may be referred to as rank-1 communication.

Although rank-2 communication may offer improved downlink performance, current UE beam management techniques are unable to adequately optimize rank-2 performance. In particular, as described above, current wireless communication standards specify that UE beam management in FR2 or millimeter wave bands is based on either SSB transmissions or CSI-RS P3 transmissions, where an SSB is a rank-1 periodic reference signal that is guaranteed to be transmitted in all 5G NR networks and a CSI-RS P3 is an optional downlink reference signal (e.g., for beam management) that may be configured differently across different 5G NR networks. However, to the extent that a CSI-RS P3 may be configured as a rank-1 signal or a rank-2 signal, there are currently no 5G NR networks that deploy a CSI-RS P3, nor have any infrastructure providers or wireless network providers indicated any plans to deploy a CSI-RS P3. As a result, per current wireless communication standards, UE beam management has to be performed based on SSB transmissions, which significantly limits the metrics that can be optimized when performing UE beam selection due to the rank-1 nature of SSB transmissions (e.g., an SSB mathematically cannot be used to optimize rank-2 performance because an SSB is always a rank-1 signal).

Accordingly, in some aspects, a UE 120 may perform a beam sweep on a PDSCH DMRS to improve UE beam selection in a manner that may optimize rank-2 performance. For example, in order to optimize rank-2 performance, a UE 120 may need to perform a beam sweep on a reference signal associated with rank-2 signaling, which excludes certain reference signals such as an SSB or a tracking reference signal (TRS) that is always configured as a rank-1 signal. Furthermore, as described above, a CSI-RS P3 is unsuitable for optimizing rank-2 performance despite being configurable as a rank-1 or rank-2 signal because there is currently no infrastructure or plan to configure or otherwise deploy a CSI-RS P3 in a 5G NR network. Furthermore, although a CSI-RS associated with a resource for acquiring channel state feedback (sometimes referred to as a CSI-RS ACQ or CSI-RS CSF) can be configured as a rank-2 signal, a CSI-RS ACQ or CSI-RS CSF is often configured aperiodically with same-slot scheduling (e.g., where a k0 parameter defining a slot offset between a PDCCH and an aperiodic CSI-RS ACQ or CSI-RS CSF scheduled by the PDCCH has a value of zero). As a result, a UE 120 may have difficulty predicting the slot(s) in which a CSI-RS ACQ or CSI-RS CSF is transmitted. Accordingly, in some aspects described herein, a UE 120 may perform a beam sweep on a PDSCH DMRS to optimize rank-2 performance, as a PDSCH DMRS may be configured as a rank-2 signal and is guaranteed to be transmitted with a PDSCH per wireless communication standards. Furthermore, although a PDSCH DMRS may be associated with same-slot scheduling (e.g., k0=0), predicting the slot(s) in which a PDSCH DMRS will be transmitted may be much easier to predict and capture in downlink-heavy scenarios (e.g., because PDSCH DMRS transmissions are downlink traffic-driven).

Some aspects described herein therefore relate to techniques to determine when to open and when to close a beam management window in which a UE 120 performs a beam sweep on a PDSCH DMRS. For example, as described in further detail herein with reference to FIGS. 5-7, a UE 120 may identify a beam management window in which to perform a beam sweep on a PDSCH DMRS based on one or more downlink traffic parameters satisfying a window opening condition (e.g., indicating an upcoming downlink-heavy time period), and the UE 120 may determine when to terminate the beam sweep to avoid degrading PDSCH performance (e.g., by limiting the number of PDSCH slots that use a weak or sub-optimal PDSCH beam, which may impact downlink channel estimation and/or increase a downlink block error rate (BLER)).

As indicated above, FIG. 4 is provided as an example of beam management procedures. Other examples of beam management procedures may differ from what is described with respect to FIG. 4. For example, the UE 120 and the base station 110 may perform the third beam management procedure before performing the second beam management procedure, and/or the UE 120 and the base station 110 may perform a similar beam management procedure to select a UE transmit beam.

Figure 5:
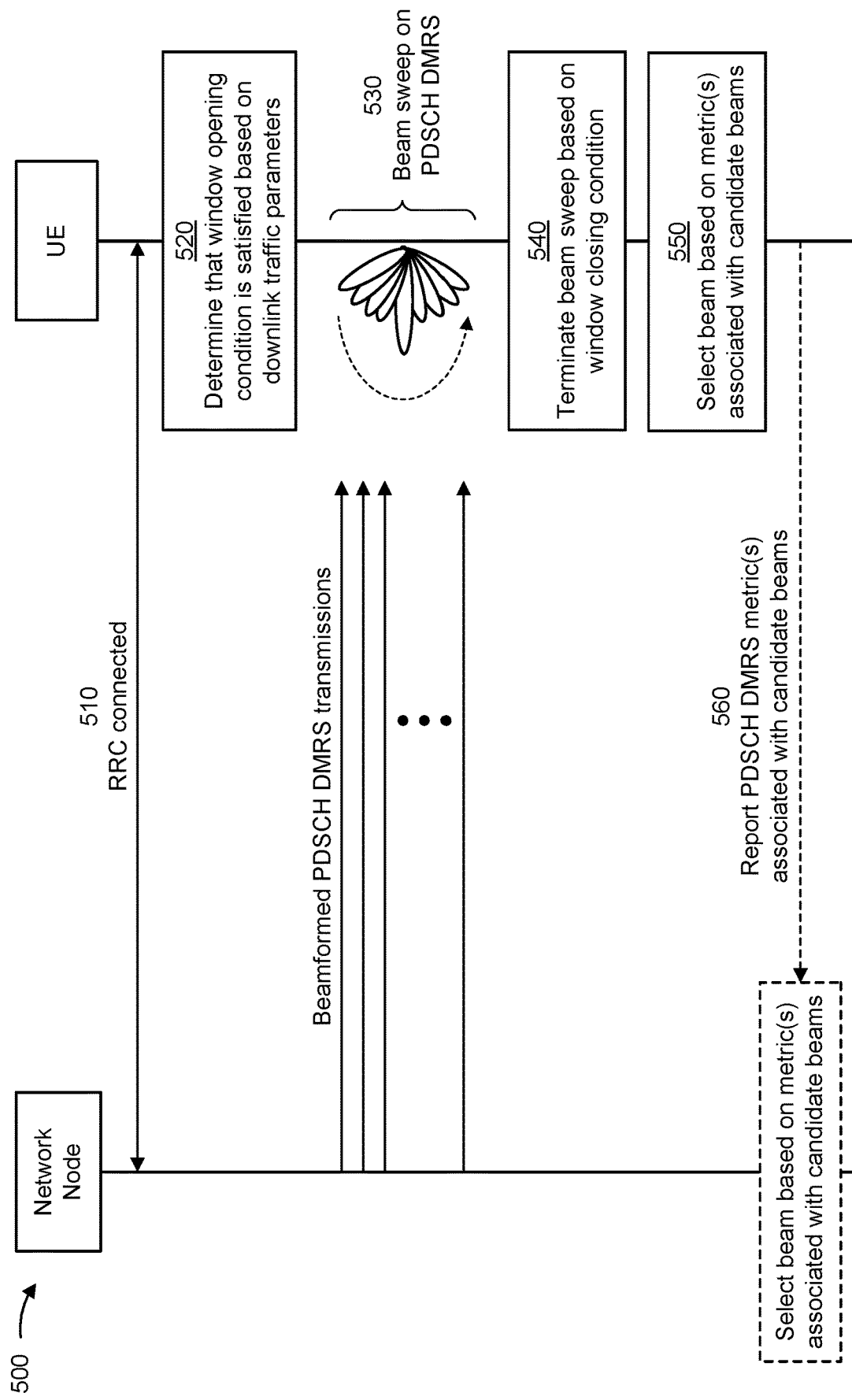
FIG. 5 is a diagram illustrating an example associated with a smart window determination for a beam sweep on a physical downlink shared channel (PDSCH) demodulation reference signal (DMRS), in accordance with the present disclosure.

FIG. 5 is a diagram illustrating an example 500 associated with a smart window determination for a beam sweep on a PDSCH DMRS, in accordance with the present disclosure. As shown in FIG. 5, example 500 includes a UE in communication with a network node (e.g., a base station, TRP, DU, RU, or the like) in a wireless network. In some aspects, the UE and the network node may communicate using beamforming via a wireless access link, which may include an uplink and a downlink.

As shown by reference number 510, the UE and the network node may be in a connected state (e.g., an RRC connected state). For example, while in the connected state, the UE may receive downlink data from the network node in one or more PDSCH transmissions and may transmit uplink data to the network node in one or more PUSCH transmissions. In some aspects, as described herein, the UE may be configured to optimize rank-2 performance (e.g., where a downlink signal is received via two spatial streams) by performing a beam sweep on a PDSCH DMRS, which may be configured as a rank-1 or rank-2 signal that is always transmitted with a PDSCH that carries one or more transport blocks (e.g., to enable downlink channel estimation and thereby improve PDSCH reception performance). In some aspects, a mapping between a PDSCH DMRS and a transmit beam used by the network node may be signaled to the UE, and the UE can typically expect that the PDSCH DMRS beam matches the serving beam used by the network node. However, because a PDSCH DMRS transmission occurs with a PDSCH to enable downlink channel estimation, PDSCH DMRS transmissions are driven by downlink traffic. Accordingly, in some aspects, the UE may monitor one or more downlink traffic parameters while in the connected state to predict or otherwise determine a beam management window (e.g., a time period in which to perform a beam sweep to select or refine a receive beam) likely to have substantial downlink traffic.

For example, while in the connected state, the network node may transmit downlink grants to the UE to schedule PDSCH transmissions and may transmit uplink grants to the UE to schedule PUSCH transmissions. Accordingly, in cases where the downlink grants include a timing offset (e.g., a k0 parameter) with a value greater than or equal to one, which refers to the number of slots between a slot in which the downlink grant is transmitted and a slot in which the scheduled PDSCH transmissions will occur, the UE may accurately determine the precise slots that will include PDSCH DMRS transmissions. However, the network node may support same-slot scheduling (e.g., where k0=0, which means that a PDSCH transmission occurs in the same slot as the scheduling downlink grant), which may prevent the UE from accurately opening a beam management window to capture PDSCH DMRS transmissions with absolute certainty. In some aspects, the UE may therefore use the downlink traffic parameters and/or other suitable information to determine when to open the beam management window in which to perform a beam sweep on PDSCH DMRS transmissions.

As further shown by reference number 520, the UE may determine that a window opening condition is satisfied based on the downlink traffic parameters. For example, as described herein, the UE may identify a beam management window (e.g., a time period with a length in a unit of slots) in which to perform a beam sweep on a PDSCH DMRS when the window opening condition is satisfied, where the beam management window may open (e.g., start) in a slot that the UE identifies based on the monitored downlink traffic parameter(s). For example, in some aspects, the downlink traffic parameter(s) may be based on the amount of served downlink traffic and/or downlink traffic requirements associated with one or more applications running on the UE. Accordingly, the UE may identify (e.g., open) the beam management window in which the beam sweep is performed on PDSCH DMRS transmissions based on the monitored downlink traffic parameter(s) satisfying the window opening condition, which may generally indicate an upcoming downlink-heavy scenario that is likely to include a sufficient number of PDSCH DMRS transmissions to enable the beam sweep.

For example, in some aspects, the downlink traffic parameters monitored by the UE may include a downlink duty cycle, and the UE may determine that the window opening condition is satisfied based on the downlink duty cycle having a value that satisfies (e.g., equals or exceeds) a threshold. For example, the downlink duty cycle may be indicated by the network node in a time division duplexing (TDD) parameter (e.g., a TDD-UL-DL-Pattern parameter) that indicates a number of uplink slots, a number of uplink symbols, a number of downlink slots, and a number of downlink symbols within a configurable period. In this case, the UE may determine that the window opening condition is satisfied based on the downlink duty cycle having a value that satisfies the threshold or that the window opening condition is not satisfied based on the downlink duty cycle having a value that fails to satisfy the threshold. In this way, by opening the beam management window only in cases where the downlink duty cycle satisfies the threshold, the UE may avoid corrupting a large proportion of PDSCH slots by using a non-PDSCH beam during the beam sweep on the PDSCH DMRS.

In another example, the downlink traffic parameters monitored by the UE may include a number of downlink grants, where the UE may determine that the window opening condition is satisfied based on the number of downlink grants received within a time period having a value that satisfies (e.g., equals or exceeds) a threshold. For example, in cases where a large number of downlink grants are received, the UE may expect more downlink grants in an upcoming time period. Accordingly, in some aspects, the UE may determine that the window opening condition is satisfied based on the number of downlink grants collected within a recent time period having a value that satisfies the threshold or that the window opening condition is not satisfied based on the number of recent downlink grants having a value that fails to satisfy the threshold.

In another example, the downlink traffic parameters monitored by the UE may include a resource block (RB) allocation, where the UE may expect to have more slots assigned to downlink communication if the number of RBs allocated to the UE is approaching a full RB allocation. Accordingly, in some aspects, the UE may determine that the window opening condition is satisfied based on the number of allocated RBs having a value that satisfies the threshold or that the window opening condition is not satisfied based on the number of allocated RBs failing to satisfy the threshold.

In another example, the downlink traffic parameters monitored by the UE may include a padding size in each downlink grant. For example, when a downlink grant indicates that a scheduled PDSCH transmission includes padding in addition to data, the existence of the padding implies that the network node does not have additional downlink traffic to send to the UE. Accordingly, in some aspects, the UE may determine that the window opening condition is satisfied based on a data ratio (e.g., an amount of data divided by the sum of the amount of data and the amount of padding, or data/(data+padding)) having a value that satisfies the threshold or that the window opening condition is not satisfied based on the data ratio failing to satisfy the threshold (e.g., when the data ratio satisfies the threshold, there may be a higher probability that there is additional downlink data pending transmission to the UE).

In another example, the downlink traffic parameters monitored by the UE may include a throughput requirement of the UE. For example, when one or more applications running on the UE have a high throughput requirement, the UE may expect a larger number or larger proportion of downlink slots. Accordingly, in some aspects, the UE may determine that the window opening condition is satisfied based on the UE throughput requirement having a value that satisfies the threshold or that the window opening condition is not satisfied based on the UE throughput requirement failing to satisfy the threshold.

Furthermore, when determining whether to open the beam management window, the UE may determine whether an elapsed time since a closing time of a most recent beam management window satisfies a threshold. For example, to avoid corrupting a large number of downlink slots, the UE may verify that the elapsed time since the closing time of the most recent beam management window satisfies the threshold, and may open the beam management window if the time difference between the current time and the time when the last beam management window closed satisfies a threshold.

Accordingly, in cases where the UE determines that one or more (e.g., all or a subset) of the parameters described above satisfy the applicable threshold, the UE may open the beam management window for performing a beam sweep on the PDSCH DMRS transmissions that occur during the beam management window. For example, when the downlink duty cycle, number of downlink grants, number of allocated RBs, padding size in each downlink grant, UE throughput requirement, and/or elapsed time since a most recent beam management window satisfy the applicable threshold(s), the UE may identify a starting slot for the beam management window (e.g., a slot in which the downlink-heavy traffic period is predicted to begin). Furthermore, in some aspects, the UE may identify the starting slot for the beam management window in a manner that excludes other reference signals that the UE needs to monitor. For example, in some aspects, the UE may configure the beam management window to exclude any slots that contain periodic reference signals (e.g., SSB and/or TRS transmissions) and/or to exclude any slots that contain aperiodic reference signals (e.g., CSI-RS P2 or CSI-RS P3 transmissions, if configured) with a timing offset greater than one (1) (e.g., k0>1, meaning that there is more than one slot between a PDCCH scheduling an aperiodic reference signal and the transmission of the aperiodic reference signal). Furthermore, in some aspects, the UE may determine a threshold number of PDSCH slots to be covered by the beam management window.

As further shown by reference number 530, the UE may perform a beam sweep on PDSCH DMRS transmissions that occur during the beam management window. For example, during the beam management window, the UE may sweep through various receive beams and obtain one or more measurements or metrics per PDSCH DMRS transmission. For example, the one or more measurements or metrics may include rank-2 metrics, such as an RSRP measurement, a signal-to-noise ratio (SNR) measurement, or a spectral efficiency measurement, among other examples. As further shown by reference number 540, the UE may terminate the beam sweep based on determining that a window closing condition is satisfied. For example, as described above, the UE may determine a threshold number of PDSCH slots to be covered by the beam management window in order to limit the number of PDSCH slots that are corrupted by using a potentially weak or otherwise sub-optimal beam (e.g., a non-PDSCH beam, which refers to a beam other than a current PDSCH receive beam). Accordingly, while performing the beam sweep, the UE may count a number of PDSCH slots and may terminate the beam sweep when the count of the number of PDSCH slots reaches the threshold.

As further shown by reference number 550, the UE may then select a beam to use to receive subsequent PDSCH transmissions based on the measurements or metrics associated with the various receive beams that were swept over the PDSCH DMRS transmissions during the beam management window. For example, in some aspects, the UE may select, among the receive beams that were swept over the PDSCH DMRS transmissions during the beam management window, a beam associated with a best rank-2 metric in order to optimize rank-2 performance. Additionally, or alternatively, in some aspects, the beam selection may be subject to a hysteresis requirement (e.g., changing the current PDSCH beam may occur only if the new PDSCH beam offers a threshold beamforming gain relative to the current PDSCH beam, such as a two decibel (dB) power improvement). In this way, the UE may avoid frequency PDSCH beam switches that may offer little performance improvement. Additionally, or alternatively, as shown by reference number 560, the UE may report the measurements or metrics associated with the beams swept over the PDSCH DMRS transmissions to the network node, which may indicate, to the UE, the PDSCH beam that the UE is to use based on the reported measurements or metrics.

As indicated above, FIG. 5 is provided as an example. Other examples may differ from what is described with regard to FIG. 5.

Figure 6:
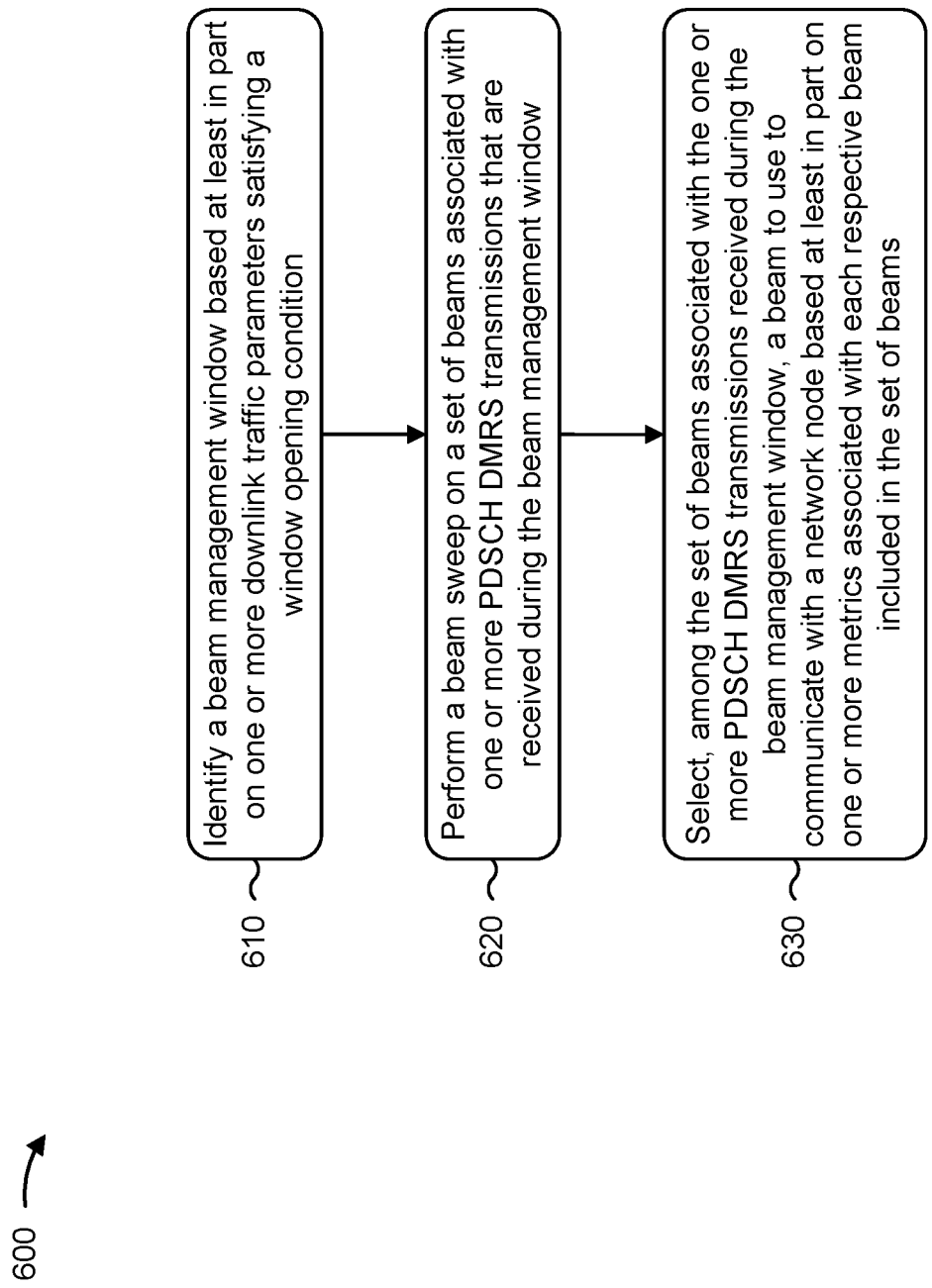
FIG. 6 is a diagram illustrating an example process associated with a smart window determination for a beam sweep on a PDSCH DMRS, in accordance with the present disclosure, in accordance with the present disclosure.

FIG. 6 is a diagram illustrating an example process 600 performed, for example, by a UE, in accordance with the present disclosure. Example process 600 is an example where the UE (e.g., UE 120) performs operations associated with a smart window determination for a beam sweep on a PDSCH DMRS.

As shown in FIG. 6, in some aspects, process 600 may include identifying a beam management window based at least in part on one or more downlink traffic parameters satisfying a window opening condition (block 610). For example, the UE (e.g., using communication manager 140 and/or beam management component 708, depicted in FIG. 7) may identify a beam management window based at least in part on one or more downlink traffic parameters satisfying a window opening condition, as described above.

As further shown in FIG. 6, in some aspects, process 600 may include performing a beam sweep on a set of beams associated with one or more PDSCH DMRS transmissions that are received during the beam management window (block 620). For example, the UE (e.g., using communication manager 140 and/or beam management component 708) may perform a beam sweep on a set of beams associated with one or more PDSCH DMRS transmissions that are received during the beam management window, as described above.

As further shown in FIG. 6, in some aspects, process 600 may include selecting, among the set of beams associated with the one or more PDSCH DMRS transmissions received during the beam management window, a beam to use to communicate with a network node based at least in part on one or more metrics associated with each respective beam included in the set of beams (block 630). For example, the UE (e.g., using communication manager 140 and/or beam management component 708) may select, among the set of beams associated with the one or more PDSCH DMRS transmissions received during the beam management window, a beam to use to communicate with a network node based at least in part on one or more metrics associated with each respective beam included in the set of beams, as described above.

Process 600 may include additional aspects, such as any single aspect or any combination of aspects described below and/or in connection with one or more other processes described elsewhere herein.

In a first aspect, the one or more downlink traffic parameters satisfy the window opening condition based at least in part on a downlink duty cycle having a value that satisfies a threshold.

In a second aspect, alone or in combination with the first aspect, the one or more downlink traffic parameters satisfy the window opening condition based at least in part on a number of downlink grants having a value that satisfies a threshold.

In a third aspect, alone or in combination with one or more of the first and second aspects, the one or more downlink traffic parameters satisfy the window opening condition based at least in part on a downlink RB allocation having a value that satisfies a threshold.

In a fourth aspect, alone or in combination with one or more of the first through third aspects, the one or more downlink traffic parameters satisfy the window opening condition based at least in part on a padding size in one or more downlink grants having a value that satisfies a threshold.

In a fifth aspect, alone or in combination with one or more of the first through fourth aspects, the one or more downlink traffic parameters satisfy the window opening condition based at least in part on a downlink throughput requirement having a value that satisfies a threshold.

In a sixth aspect, alone or in combination with one or more of the first through fifth aspects, the window opening condition is satisfied based at least in part on an elapsed time since a closing time of a most recent beam management window having a value that satisfies a threshold.

In a seventh aspect, alone or in combination with one or more of the first through sixth aspects, process 600 includes terminating the beam sweep based at least in part on a count of the one or more PDSCH DMRS transmissions received during the beam management window satisfying a threshold.

In an eighth aspect, alone or in combination with one or more of the first through seventh aspects, the beam management window excludes any slots that contain a periodic reference signal.

In a ninth aspect, alone or in combination with one or more of the first through eighth aspects, the beam management window excludes any slots that contain an aperiodic reference signal associated with a timing offset parameter having a value greater than one.

In a tenth aspect, alone or in combination with one or more of the first through ninth aspects, the one or more metrics used to select the beam include one or more rank-2 metrics.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
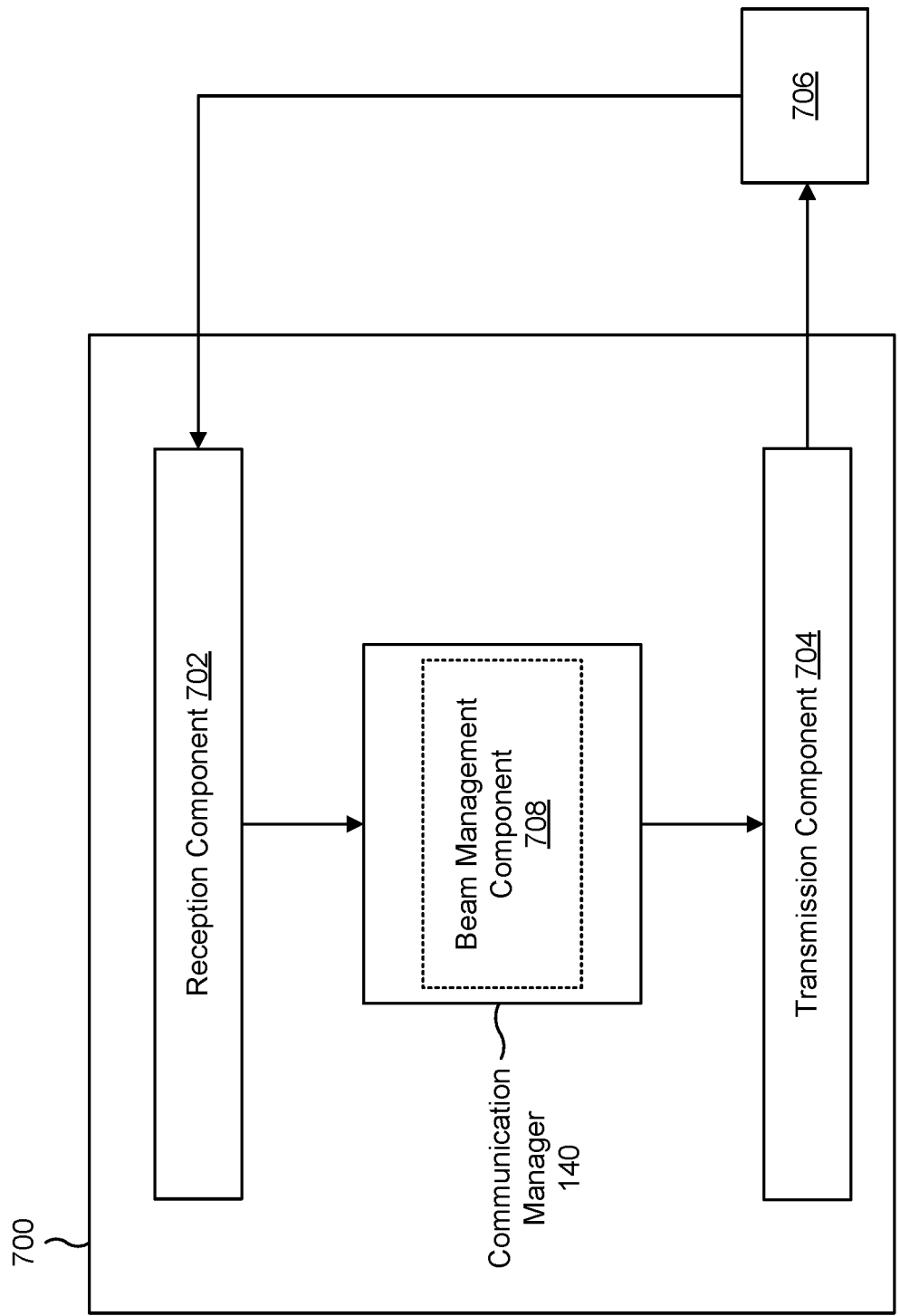
FIG. 7 is a diagram of an example apparatus for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include beam management component 708, among other examples.

In some aspects, the apparatus 700 may be configured to perform one or more operations described herein in connection with FIG. 5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The beam management component 708 may identify a beam management window based at least in part on one or more downlink traffic parameters satisfying a window opening condition. The beam management component 708 may perform a beam sweep on a set of beams associated with one or more PDSCH DMRS transmissions that are received during the beam management window. The beam management component 708 may select, among the set of beams associated with the one or more PDSCH DMRS transmissions received during the beam management window, a beam to use to communicate with a network node based at least in part on one or more metrics associated with each respective beam included in the set of beams.

The beam management component 708 may terminate the beam sweep based at least in part on a count of the one or more PDSCH DMRS transmissions received during the beam management window satisfying a threshold.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a UE, comprising: identifying a beam management window based at least in part on one or more downlink traffic parameters satisfying a window opening condition; performing a beam sweep on a set of beams associated with one or more PDSCH DMRS transmissions that are received during the beam management window; and selecting, among the set of beams associated with the one or more PDSCH DMRS transmissions received during the beam management window, a beam to use to communicate with a network node based at least in part on one or more metrics associated with each respective beam included in the set of beams.

Aspect 2: The method of Aspect 1, wherein the one or more downlink traffic parameters satisfy the window opening condition based at least in part on a downlink duty cycle having a value that satisfies a threshold.

Aspect 3: The method of any of Aspects 1-2, wherein the one or more downlink traffic parameters satisfy the window opening condition based at least in part on a number of downlink grants having a value that satisfies a threshold.

Aspect 4: The method of any of Aspects 1-3, wherein the one or more downlink traffic parameters satisfy the window opening condition based at least in part on a downlink resource block allocation having a value that satisfies a threshold.

Aspect 5: The method of any of Aspects 1-4, wherein the one or more downlink traffic parameters satisfy the window opening condition based at least in part on a padding size in one or more downlink grants having a value that satisfies a threshold.

Aspect 6: The method of any of Aspects 1-5, wherein the one or more downlink traffic parameters satisfy the window opening condition based at least in part on a downlink throughput requirement having a value that satisfies a threshold.

Aspect 7: The method of any of Aspects 1-6, wherein the window opening condition is satisfied based at least in part on an elapsed time since a closing time of a most recent beam management window having a value that satisfies a threshold.

Aspect 8: The method of any of Aspects 1-7, further comprising: terminating the beam sweep based at least in part on a count of the one or more PDSCH DMRS transmissions received during the beam management window satisfying a threshold.

Aspect 9: The method of any of Aspects 1-8, wherein the beam management window excludes any slots that contain a periodic reference signal.

Aspect 10: The method of any of Aspects 1-9, wherein the beam management window excludes any slots that contain an aperiodic reference signal associated with a timing offset parameter having a value greater than one.

Aspect 11: The method of any of Aspects 1-10, wherein the one or more metrics used to select the beam include one or more rank-2 metrics.

Aspect 12: An apparatus for wireless communication at a device, comprising a processor; memory coupled with the processor; and instructions stored in the memory and executable by the processor to cause the apparatus to perform the method of one or more of Aspects 1-11.

Aspect 13: A device for wireless communication, comprising a memory and one or more processors coupled to the memory, the one or more processors configured to perform the method of one or more of Aspects 1-11.

Aspect 14: An apparatus for wireless communication, comprising at least one means for performing the method of one or more of Aspects 1-11.

Aspect 15: A non-transitory computer-readable medium storing code for wireless communication, the code comprising instructions executable by a processor to perform the method of one or more of Aspects 1-11.

Aspect 16: A non-transitory computer-readable medium storing a set of instructions for wireless communication, the set of instructions comprising one or more instructions that, when executed by one or more processors of a device, cause the device to perform the method of one or more of Aspects 1-11.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   identifying a beam management window in which to perform a beam sweep on a physical downlink shared channel (PDSCH) demodulation reference signal (DMRS) based at least in part on one or more downlink traffic parameters satisfying a window opening condition,
   wherein the PDSCH DMRS is configured as a rank-2 signal;
   performing the beam sweep on a set of beams associated with one or more PDSCH DMRS transmissions that are received during the beam management window; and
   selecting, among the set of beams associated with the one or more PDSCH DMRS transmissions received during the beam management window, a beam to use to communicate with a network node based at least in part on one or more metrics associated with each respective beam included in the set of beams.

2. The method of claim 1, wherein the one or more downlink traffic parameters satisfy the window opening condition based at least in part on a downlink duty cycle having a value that satisfies a threshold.

3. The method of claim 1, wherein the one or more downlink traffic parameters satisfy the window opening condition based at least in part on a number of downlink grants having a value that satisfies a threshold.

4. The method of claim 1, wherein the one or more downlink traffic parameters satisfy the window opening condition based at least in part on a downlink resource block allocation having a value that satisfies a threshold.

5. The method of claim 1, wherein the one or more downlink traffic parameters satisfy the window opening condition based at least in part on a padding size in one or more downlink grants having a value that satisfies a threshold.

6. The method of claim 1, wherein the one or more downlink traffic parameters satisfy the window opening condition based at least in part on a downlink throughput requirement having a value that satisfies a threshold.

7. The method of claim 1, wherein the window opening condition is satisfied based at least in part on an elapsed time since a closing time of a most recent beam management window having a value that satisfies a threshold.

8. The method of claim 1, further comprising:
   terminating the beam sweep based at least in part on a count of the one or more PDSCH DMRS transmissions received during the beam management window satisfying a threshold.

9. The method of claim 1, wherein the beam management window excludes any slots that contain a periodic reference signal.

10. The method of claim 1, wherein the beam management window excludes any slots that contain an aperiodic reference signal associated with a timing offset parameter having a value greater than one.

11. The method of claim 1, wherein the one or more metrics used to select the beam include one or more rank-2 metrics.

12. A user equipment (UE) for wireless communication, comprising:
    one or more memories; and
    one or more processors, coupled to the one or more memories, configured to:
      identify a beam management window in which to perform a beam sweep on a physical downlink shared channel (PDSCH) demodulation reference signal (DMRS) based at least in part on one or more downlink traffic parameters satisfying a window opening condition,
      wherein the PDSCH DMRS is configured as a rank-2 signal;
      perform the beam sweep on a set of beams associated with one or more PDSCH DMRS transmissions that are received during the beam management window; and
      select, among the set of beams associated with the one or more PDSCH DMRS transmissions received during the beam management window, a beam to use to communicate with a network node based at least in part on one or more metrics associated with each respective beam included in the set of beams.

13. The UE of claim 12, wherein the one or more downlink traffic parameters satisfy the window opening condition based at least in part on a downlink duty cycle having a value that satisfies a threshold.

14. The UE of claim 12, wherein the one or more downlink traffic parameters satisfy the window opening condition based at least in part on a number of downlink grants having a value that satisfies a threshold.

15. The UE of claim 12, wherein the one or more downlink traffic parameters satisfy the window opening condition based at least in part on a downlink resource block allocation having a value that satisfies a threshold.

16. The UE of claim 12, wherein the one or more downlink traffic parameters satisfy the window opening condition based at least in part on a padding size in one or more downlink grants having a value that satisfies a threshold.

17. The UE of claim 12, wherein the one or more downlink traffic parameters satisfy the window opening condition based at least in part on a downlink throughput requirement having a value that satisfies a threshold.

18. The UE of claim 12, wherein the window opening condition is satisfied based at least in part on an elapsed time since a closing time of a most recent beam management window having a value that satisfies a threshold.

19. The UE of claim 12, wherein the one or more processors are further configured to:
terminate the beam sweep based at least in part on a count of the one or more PDSCH DMRS transmissions received during the beam management window satisfying a threshold.

20. The UE of claim 12, wherein the beam management window excludes any slots that contain a periodic reference signal.

21. The UE of claim 12, wherein the beam management window excludes any slots that contain an aperiodic reference signal associated with a timing offset parameter having a value greater than one.

22. The UE of claim 12, wherein the one or more metrics used to select the beam include one or more rank-2 metrics.

23. A non-transitory computer-readable medium storing a set of instructions for wireless communication, the set of instructions comprising:
one or more instructions that, when executed by one or more processors of a user equipment (UE), cause the UE to:
identify a beam management window in which to perform a beam sweep on a physical downlink shared channel (PDSCH) demodulation reference signal (DMRS) based at least in part on one or more downlink traffic parameters satisfying a window opening condition,
wherein the PDSCH DMRS is configured as a rank-2 signal;
perform the beam sweep on a set of beams associated with one or more PDSCH DMRS transmissions that are received during the beam management window; and
select, among the set of beams associated with the one or more PDSCH DMRS transmissions received during the beam management window, a beam to use to communicate with a network node based at least in part on one or more metrics associated with each respective beam included in the set of beams.

24. The non-transitory computer-readable medium of claim 23, wherein the one or more downlink traffic parameters satisfy the window opening condition based at least in part on one or more of a downlink duty cycle, a number of downlink grants, a downlink resource block allocation, a padding size in one or more downlink grants, or a downlink throughput requirement having a value that satisfies a threshold.

25. The non-transitory computer-readable medium of claim 23, wherein the window opening condition is satisfied based at least in part on an elapsed time since a closing time of a most recent beam management window having a value that satisfies a threshold.

26. The non-transitory computer-readable medium of claim 23, wherein the one or more instructions further cause the UE to:
terminate the beam sweep based at least in part on a count of the one or more PDSCH DMRS transmissions received during the beam management window satisfying a threshold.

27. The non-transitory computer-readable medium of claim 23, wherein the beam management window excludes any slots that contain a periodic reference signal.

28. The non-transitory computer-readable medium of claim 23, wherein the beam management window excludes any slots that contain an aperiodic reference signal associated with a timing offset parameter having a value greater than one.

29. The non-transitory computer-readable medium of claim 23, wherein the one or more metrics used to select the beam include one or more rank-2 metrics.

30. An apparatus for wireless communication, comprising:
means for identifying a beam management window in which to perform a beam sweep on a physical downlink shared channel (PDSCH) demodulation reference signal (DMRS) based at least in part on one or more downlink traffic parameters satisfying a window opening condition,
wherein the PDSCH DMRS is configured as a rank-2 signal;
means for performing the beam sweep on a set of beams associated with one or more PDSCH DMRS transmissions that are received during the beam management window; and
means for selecting, among the set of beams associated with the one or more PDSCH DMRS transmissions received during the beam management window, a beam to use to communicate with a network node based at least in part on one or more metrics associated with each respective beam included in the set of beams.

* * * * *